(12) United States Patent
Van Poucke et al.

(10) Patent No.: US 12,029,215 B2
(45) Date of Patent: Jul. 9, 2024

(54) AGRICULTURAL IMPLEMENT BOOM LEVELING CONTROLLER AND METHOD

(71) Applicant: Spraying Systems Co., Wheaton, IL (US)

(72) Inventors: Tim F. Van Poucke, Zwijnaarde (BE); Herman M. Ramon, Ghent (BE); Jens Aksel Skjærbæk Søndergaard, Gandrup (DK)

(73) Assignee: Spraying Systems Co., Wheaton, IL (US)

( * ) Notice: Subject to any disclaimer, the term of this patent is extended or adjusted under 35 U.S.C. 154(b) by 465 days.

(21) Appl. No.: 17/557,771

(22) Filed: Dec. 21, 2021

(65) Prior Publication Data

US 2022/0211027 A1    Jul. 7, 2022

Related U.S. Application Data

(60) Provisional application No. 63/133,621, filed on Jan. 4, 2021.

(51) Int. Cl.
*A01M 7/00* (2006.01)
(52) U.S. Cl.
CPC ........ *A01M 7/0089* (2013.01); *A01M 7/0071* (2013.01)
(58) Field of Classification Search
CPC .............. A01M 7/0089; A01M 7/0071; A01M 7/0057; A01B 79/005
See application file for complete search history.

(56) References Cited

U.S. PATENT DOCUMENTS

| 5,548,226 A | 8/1996 | Takekuma et al. |
| 6,834,223 B2 | 12/2004 | Strelioff et al. |

(Continued)

FOREIGN PATENT DOCUMENTS

| EP | 3469903 B1 | 5/2020 | |
| FR | 2603453 A1 | 3/1988 | |
| WO | WO-2017134659 A1 * | 8/2017 | ........... B64C 31/036 |

OTHER PUBLICATIONS

International Bureau, International Search Report in International Application No. PCT/US2021/064597, mailed Apr. 20, 2022.

*Primary Examiner* — Justin Holmes
(74) *Attorney, Agent, or Firm* — Leydig, Voit & Mayer, Ltd.

(57) ABSTRACT

A system and method are described for controlled leveling of a multi-wing spray boom assembly. A multi-loop cascading controller arrangement includes a main controller that renders actuation control commands to an actuator controller for causing positioning of actuators of the multi-wing boom assembly to reduce a determined current position error of the assembly in relation to a determined contour. The main controller operates, according to a main controller repetition cycle period within which an actuation command is rendered for implementation by the actuator controller, to generate positioning commands to be carried out by the actuator controller. The actuator controller executes an actuator controller loop, independently of the main controller and in accordance with an actuator controller repetition cycle period having a duration that is independent of the main controller repetition cycle period, to generate control signals for the actuators of the multi-wing boom assembly.

32 Claims, 7 Drawing Sheets

(56) References Cited

U.S. PATENT DOCUMENTS

| | | |
|---|---|---|
| 10,244,747 B2 | 4/2019 | Leeb et al. |
| 2006/0118654 A1 | 6/2006 | Shivak |
| 2013/0345937 A1 | 12/2013 | Strelioff et al. |
| 2014/0074360 A1 | 3/2014 | Rosa et al. |
| 2018/0027727 A1* | 2/2018 | Leeb .................... A01C 23/047 |
| 2020/0029484 A1 | 1/2020 | Weidenbach et al. |
| 2020/0315108 A1 | 10/2020 | Alders et al. |
| 2021/0139147 A1* | 5/2021 | Madison ................. B05B 1/083 |

* cited by examiner

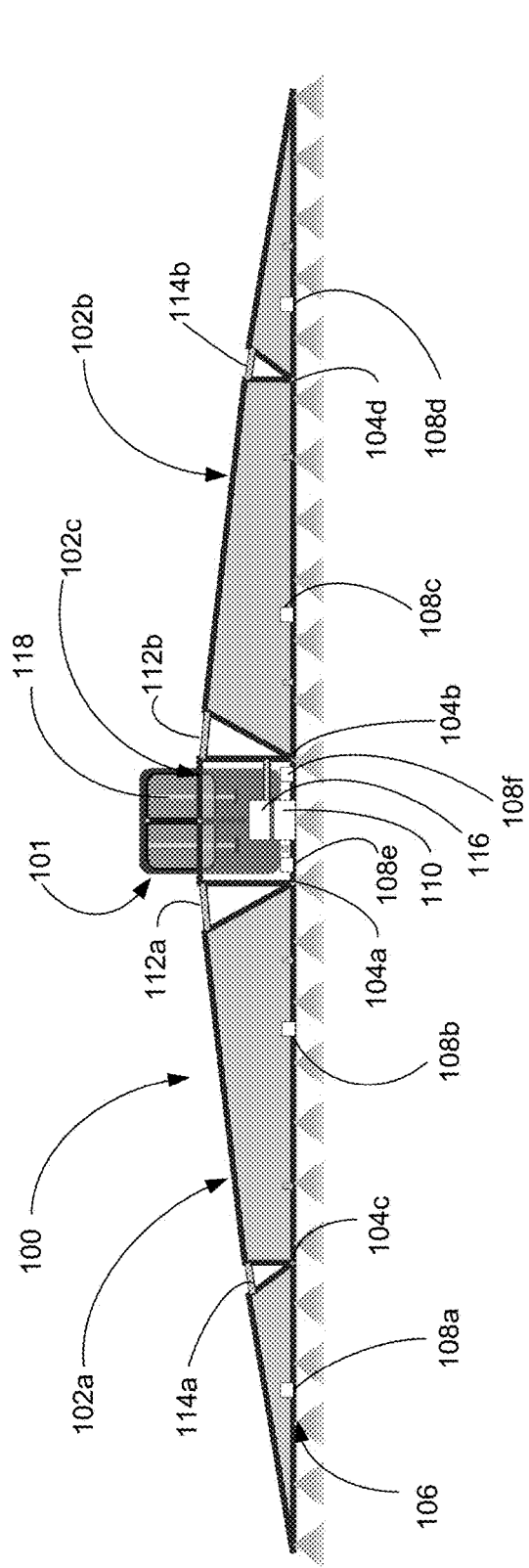
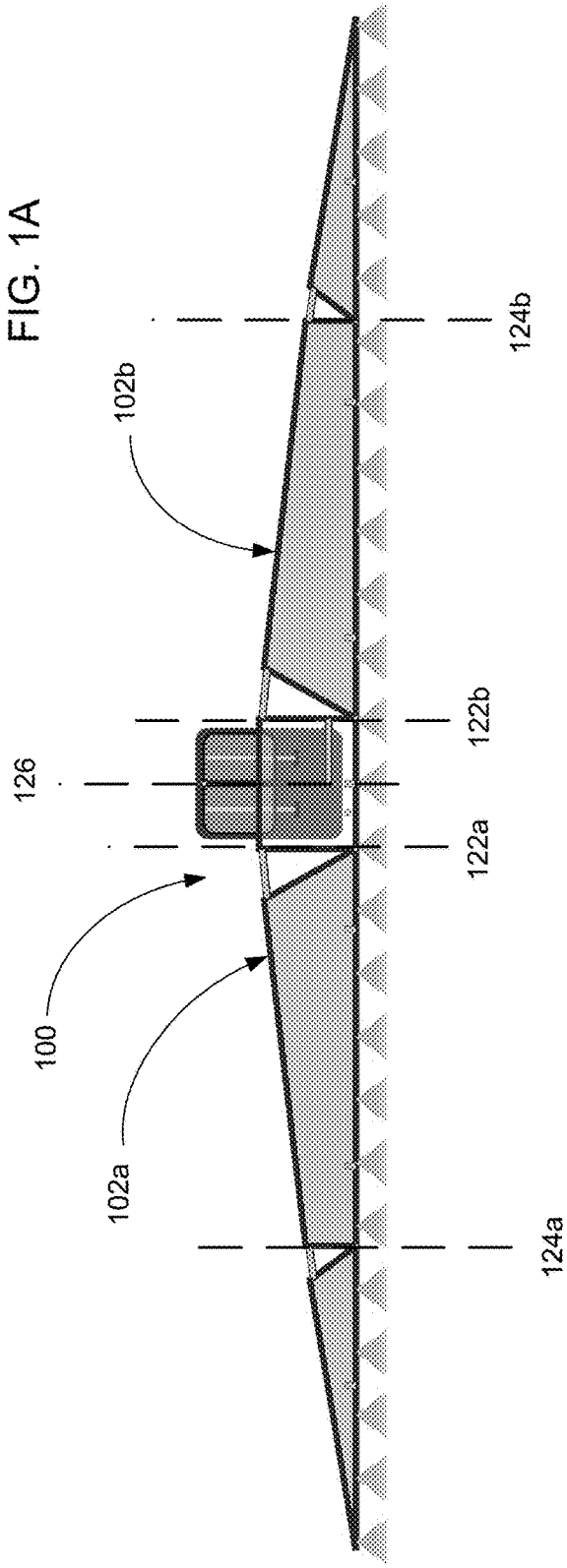
FIG. 1A
FIG. 1B

AGRICULTURAL IMPLEMENT BOOM LEVELING CONTROLLER AND METHOD

CROSS-REFERENCE TO RELATED APPLICATIONS

This patent application is a non-provisional of and claims priority of U.S. Provisional Application No. 63/133,621, filed Jan. 4, 2021, entitled "AGRICULTURAL IMPLEMENT BOOM LEVELING CONTROLLER AND METHOD" which is expressly incorporated by reference in its entirety, including any references contained therein.

AREA OF THE INVENTION

The present disclosure generally relates to systems and methods for controlling boom leveling and/or orientation in an agricultural spraying implement. More particularly, the present disclosure relates to a control system where a plurality of sensor readings are processed to control a boom level and/or orientation, via real-time actuator operation, during operation of the agricultural spraying implement.

BACKGROUND OF THE INVENTION

In farming, farm implements including booms (see e.g., FIG. 1), which extend laterally from a hitch point to a tractor, have been fitted with sprayer assemblies including a plurality of spray nozzles used to carry out a wide variety of operations such as fertilizing crops, killing insects and weeds, applying plant protecting products, etc.

A challenge faced by farmers when using agricultural spraying implements is that they require use of tractor to pull the implement in a field containing emerged plants. Driving a heavy tractor through such fields carries the potential to damage the emerged plant structure as well as root structures beneath the field surface. Such damage can be reduced by minimizing the number of sweeps made by the tractor through the field by maximizing the lateral range/reach of a spray boom carrying the plurality of spray nozzles. As a result, it is not unusual for spray booms to extend 30 or more feet in each lateral direction (60 total feet) from a hitch point. It is further noted that wider booms also decrease the amount of operating time needed to complete a spraying task in the field.

The relatively large span of spray assembly booms presents a problem when operating agricultural spraying implements over fields having uneven terrain. During operation, it is generally desirable to have the boom extend on a plane parallel to the field/plants. Such relative positioning ensures an equal distribution of sprayed material on the field/plants. The assurance of equal distribution, in turn, facilitates using less material (if an over-supply of material is otherwise needed to ensure sufficient material is applied to all plants) and ensures against over-application of material (if a boom/spray nozzle gets too close to the crop/plants/ground due to uneven terrain).

Importantly, dynamic boom leveling coupled with distance sensors facilitates maintaining a closer relationship between the boom/spray nozzles and the field/plants. As a result, a material can be applied even in moderately windy conditions without excessive risk that the sprayed material will be carried away by the wind (i.e. achieving desirable material drift reduction). To achieve such sprayer performance/characteristics, boom heights are sometimes required to be as close as 25-35 cm. above the ground surface. It is also desirable to move as quickly as possible while spraying.

Additionally, depending on variations in the crop pattern arising from a shape or incline of a field, a different boom orientation could be desired. One such example is during turning on headland. In that case, there is nothing being sprayed. For maneuverability, it could be beneficial to raise the left and right wing (variable geometry) of the boom assembly slightly upwards. Such temporary raising of the wings increases ground clearance, thus adding a safety buffer distance from the ground to accommodate possible centripetal forces acting on the boom during sharp turns causing a tipping of the boom wings.

Effective dynamic boom wing level control is virtually impossible to obtain by manually raising and lowering the wings in response to terrain changes and other conditions arising during operation that warrant raising/lowering one or both boom wings. For this reason, automated control has been proposed. However, implementation of automated control has its own challenges to ensure the boom wings are raised and/or lowered by a proper amount and in a timely manner.

SUMMARY OF THE INVENTION

A method is described herein for controlled leveling of a multi-wing boom assembly by a multi-loop cascading controller arrangement including a main controller that renders actuation control commands to an actuator controller for causing positioning of actuators of the multi-wing boom assembly to minimize a determined current position error of components of the multi-wing boom assembly in relation to a determined contour of a field over which the multi-wing boom assembly is currently passing. The method includes executing, by the main controller operating according to a main controller repetition cycle period within which an actuation command is rendered for implementation by the actuator controller, a main controller loop to generate positioning commands to be carried out by the actuator controller. The method further includes executing, by the actuator controller independently of the main controller and in accordance with an actuator controller repetition cycle period having a duration that is independent of the main controller repetition cycle period, an actuator controller loop to generate control signals for the actuators of the multi-wing boom assembly.

Additionally, a system is described herein for carrying out a controlled leveling of a multi-wing boom assembly by a multi-loop cascading controller arrangement. The system includes a main controller that renders actuation control commands. The system further includes an actuator controller for causing positioning of actuators of the multi-wing boom assembly to minimize a determined current position error of components of the multi-wing boom assembly in relation to a determined contour of a field over which the multi-wing boom assembly is currently passing. The main controller and the actuator controller are configured to carry out a method that includes executing, by the main controller operating according to a main controller repetition cycle period within which an actuation command is rendered for implementation by actuator controller, a main controller loop to generate positioning commands to be carried out by the actuator controller. The implemented method further includes executing, by the actuator controller independently of the main controller and in accordance with an actuator controller repetition cycle period having a duration that is independent of the main controller repetition cycle period, an actuator controller loop to generate control signals for the actuators of the multi-wing boom assembly.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 1A is a schematic diagram of an exemplary tractor and a following multi-wing spray boom which incorporates a boom wing level control arrangement in accordance with an illustrative example;

FIG. 1B is a schematic diagram of an exemplary tractor and a following multi-wing spray boom and wherein various controlled/actuated hinge points and corresponding boom/wing movements are depicted in accordance with an illustrative example;

DETAILED DESCRIPTION OF THE INVENTION

Figure 1C:
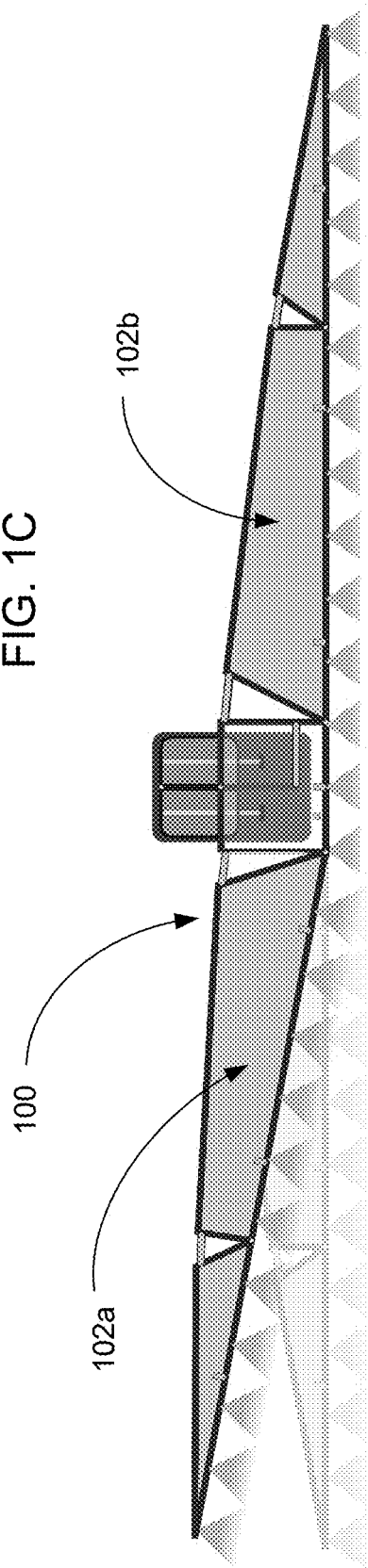
FIG. 1C is a schematic diagram of an exemplary tractor and a following multi-wing spray boom where a left wing is raised by an actuator positions at a hinge point between the left wing and center section of a spray boom in accordance with an illustrative example.

In the present disclosure, a robust system and method are described to actively control, via a cascading pair of control loops driven by a combination of contour reference and sensor data, a level and/or orientation of a multi-wing boom assembly as shown, by way of example, in FIG. IA. In accordance with the illustrative example, a multi-wing spray boom assembly 100 is attached to, and drawn behind, a tractor 101. While the illustrative example of a spray boom physical geometry control arrangement is provided in the context of a trailing spray boom assembly, the current disclosure is also applicable to front-mounted spray booms, self-propelled sprayers, slurry tankers, vineyard spray assemblies, mounted sprayers, etc.

In the illustrative example, the multi-wing boom assembly 100 includes a left wing 102a, a right wing 102b, and a mid-section 102c. In the illustrative example, only the left wing 102a and the right wing 102b are rotated up/down with respect to the mid-section 102c that is mounted upon a carriage (or other suitable support structure) that supports the multi-wing boom assembly 100. In the illustrative example, the left wing 102a and the right wing 102b are coupled to the mid-section 102c at a hinge 104a and a hinge 104b, respectively.

With continued reference to FIG. 1A, a multitude of individually controllable actuators are provided to facilitate re-positioning and/or re-orienting the multi-wing spray boom assembly 100 and, individually, each of the left wing 102a, right wing 102b and mid-section 102c. A lift actuator 110 facilitates raising/lowering the spray boom assembly 100 as a whole in relation to a mounting frame 118. By way of illustrative example, the lift 110 actuator raises/lowers the boom assembly 100 along a path defined by the vertical/parallel rails of the mounting frame 118. It is emphasized that the physical orientation and geometry of the mounting frame 118 (including the particular arrangement of rails) varies in accordance with various implementations. Wing lifting actuators 112a and 112b, rotate up/down the left wing 102a and the right wing 102b at the hinges 104a and 104b connecting the mid-section 102c to each of the left wing 102a and the right wing 102b base, respectively. Wing tip lifting actuators 114a and 114b rotate up/down an outer segment of the left wing 102a and the right wing 102b, respectively at hinge points 104c and 104d (between segments within the wings 102a and 102b) similar to hinges 104a and 104b. A boom tilt actuator 116 is provided to rotate the spray boom assembly 100 in its entirety in relation to the mounting frame 118 (e.g. a sprayer chassis)—causing, for example, a left side of the boom assembly 100 to rotate above horizontal and the right side to rotate (i.e., raising one side/wing above horizontal while lowering the other by an equal amount below horizontal).

The illustrative multi-wing spray boom assembly 100 further comprises a spray nozzles 106 arranged, for example as a linear array of downward directed spray nozzles for providing a downward sprayed material onto crops. Additionally, in accordance with the illustrative example, contour proximity sensors 108a, 108b, 108c, 108d, 108e and 108f are arranged upon the left wing 102a, the mid-section 102c, and the right wing 102b of the multi-wing spray boom assembly 100 to provide a feedback ground/crop proximity (distance) measurement signal as a feedback parameter to facilitate active control of distances between the spray nozzles 106 arranged on the left wing 102a, mid-section 102c and the right wing 102b and the field/crops below. A variety of sensor types are contemplated for the contour proximity sensors 108a, 108b, 108c, 108d, 108e and 108f. In addition to known distance measuring systems (laser, ultrasound, LIDAR's, radars, etc.), mounted cameras may provide optical proximity sensor information.

The multi-wing spray boom assembly 100 depicted in FIG. 1A is merely exemplary in nature. Those skilled in the art will appreciate, in view of the disclosure herein, that the boom assembly height/orientation control arrangement described herein is applicable to a wide variety of physical spray boom assemblies in accordance with various implementations of the control arrangement described herein.

Turning to FIG. 1B, a schematic diagram is provided of an exemplary tractor and a following multi-wing spray boom, wherein various controlled/actuated hinge points and corresponding boom/wing movements are depicted. Reference lines 122a and 122b correspond to hinge/actuator combinations that, in operation, cause a rotation upward/downward of the entire left wing 102a and right wing 102b. Reference lines 124a and 124b correspond to hinge/actuator combinations that, in operation, cause a rotation upward/downward of the left winglet and right winglet. Reference line 126 corresponds to a location (on the line 126) at which the entire boom assembly 100 rotates.

Turning briefly to FIG. 1C, the left wing 102a is shown in a rotated up position. It is further noted that, with regard to FIG. 1C, a sudden raising of the left wing 102a may/will induce a swinging (up/down) movement of the right wing 102b.

Figure 2:
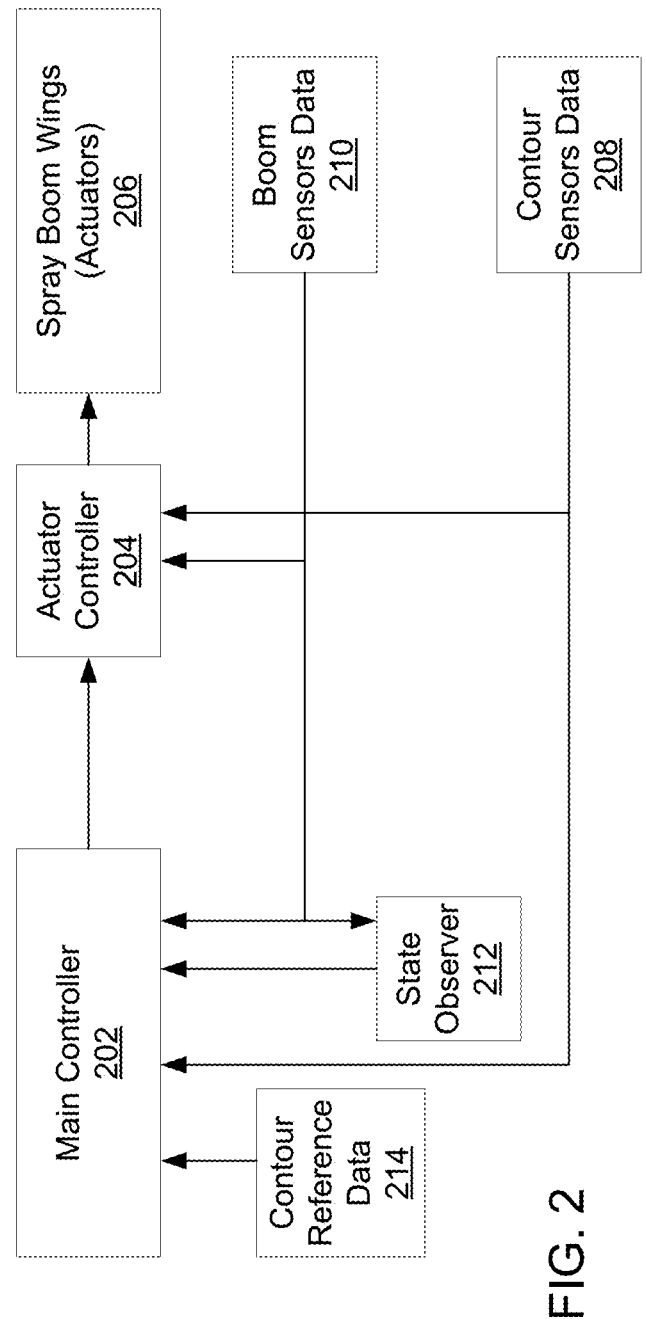
FIG. 2 is a schematic diagram summarizing a control arrangement implemented by a multi-controller, multi-sensor, multi-data source/stream spray boom leveling control arrangement in accordance will an illustrative example.

Turning to FIG. 2, a schematic diagram summarizes a multi-wing boom level control arrangement in accordance with an illustrative example. It is specifically noted that the control arrangement depicted in FIG. 2 is not intended to constrain the physical component arrangement of sensors and processing elements in any way. For example, main control and actuator control can be configured and executed on a single physical processor. Conversely, the control operations of the main control and the actuator control described herein may be executed on distributed smart sensor/actuator components (e.g. the distance sensors and/or boom actuators operating in a coordinated manner based on shared date).

In accordance with the illustrative example, closed loop control is carried out independently by a main controller 202 and an actuator controller 204. The actuator controller 204 executes a control loop driven by actuator commands (e.g. actuator set points) issued by the main controller 202 and actuator position sensor data indicating a current status of boom wing position actuators. The actuator controller 204 derives an actuator position difference value based upon the actuator command (set point) and the fed back actual position data. The actuator controller 204 thereafter issues actuator control signals based upon the derived actuator position difference value.

The main controller 202, based upon a multitude of input data types (described herein below), executes an automated multi-wing spray boom positioning control scheme, augmented by human operator over-ride control input, that derives and issues actuator repositioning commands for submission to the actuator controller 204 to correct positioning error (i.e. difference between current and target distances between the spray nozzles 106 and the field contour below). Such control can be very complex—including taking into consideration the mechanical/physical interaction between actuation of the left wing 102a and the right wing 102b (and resulting tipping of the entire boom assembly 100 arising from asymmetrical raising/lowering of the individual wings 102a and 102b of the spray boom assembly 100).

As shown in FIG. 2, the main controller 202 receives input from a variety of sources. A target distance between spray nozzles mounted on the wings 102a and 102b and a current field surface is provided by a contour reference data 214. The contour reference data 214 provides, in accordance with a current location of the spray boom assembly 100 within a field, a general desired target distance between the spray nozzles 106 on the wings 102a and 102b of the multi-wing spray boom assembly 100 in relation to a field surface (e.g. the ground, the tops of the crop, etc.). A current (measured) distance to a contour of the field/crop beneath the wings 102a and 102b is provided by a contour sensors data 208 to the main controller 202 and the actuator controller 204. The contour sensors data 208 is generally a set of distances measured by, in the illustrative example of FIG. 1, the sensors 108a, 108b, 108c and 108f.

Additionally, a current state of configuration (shape/orientation) of the multi-wing spray boom assembly 100 is provided by a boom sensor data 210 to the main controller 202.

Lastly, the main controller 202 is configured to additionally receive an input from a state observer 212. The state observer 212 receives input from the boom sensors 210 (indicating current physical configuration of the wings 102a and 102b). The output of the state observer to the main controller 202 includes, for example, absolute boom rotation angle (compared to gravity) and speed. Additionally, the state observer 212 may also provide to the main controller 202, off-boom measurements such as the current tilt (in relation to gravity) of a trailer to which the boom is mounted, etc. Such tilt information is provided, for example, by a gyro mounted to the trailer. In such case, a three-dimensional "disturbance" vector is provided in accordance with the output of the gyro.

Based upon the combined inputs from the above-identified exemplary sources, the main controller 202 derives positioning errors of each wing component of the multi-wing spray boom assembly 100 and issues actuator control commands, corresponding to actuator adjustments needed in view of the positioning errors, to the actuator controller 204. The actuator controller 204 thereafter carries out an actuator control loop, in accordance with the actuator control commands received from the main controller 202, with respect to each of the actuators (cylinders) to achieve a re-orientation (i.e. rotating up/down at a hinge point) of the left wing 102a and the right wing 102b with respect to the mid-section 102c of the multi-wing spray boom assembly 100. The operation of the actuator controller 204 to provide control output to the actuators 206 is additionally based upon, for example, feedback provided by the boom sensors data 210 (indicating current state/positions of boom actuators) and the contour sensors data 208 (providing a short delay/high speed "safety" over-ride actuation of the wings to prevent damage to boom system 100 components arising from impact between the boom and an encountered obstacle).

In accordance with various illustrative examples, the main controller 202 incorporates any one or more of a variety of closed-loop control arrangements. Such control arrangements include PID (proportional integral derivative) control in either multiple input/multiple output format, multiple single input/single output format, etc.; a state space feedback; an $H_\infty$-control; and/or a non-linear control (e.g. sliding mode control). The main controller 202, in the illustrative example incorporating a two-stage cascaded control arrangement, executes an upstream control loop on a relatively slowly responding system (i.e., the boom assembly 100) to render actuator (repositioning) device set points. The actuator controller 204, executes a downstream control loop on relatively fast responding actuator components to carry out actuator repositioning commands (specifying actuator set points/deltas) specified by the main controller 202.

In an illustrative example, the main controller 202 and the actuator controller 204 independently implement any of a wide range of control output damping. Depending on the conditions under which the boom assembly 100 operates (e.g. fast changing terrain), physical characteristics of the boom assembly 100 (wing length, mass, flexibility, springs, dampers, etc.), and actuator device performance parameters (e.g. power, capacity, etc.), certain control output damping characteristics can be adjusted/configured/set (both before and during operation in a field). In an illustrative example, an underdamped control scheme is used to ensure sufficient responsiveness of the system to quickly eliminate positioning errors (of the wings) arising from relatively sudden changes arising from a disturbance (e.g. a sudden change in the field contour beneath one or both of the left wing 102*a* and the right wing 102*b*.

The degree of damping exhibited in the control output of the main controller 202 and the actuator controller 204 is adjustable in accordance with various illustrative embodiments and configurable control modes. As such, in accordance with illustrative example, damping is increased for systems and/or operating conditions where disturbances are generally small and/or responsiveness of the boom wing positioning system is relatively slow, and requires an overdamped control output by the main controller 202 to avoid over-correction/compensation which would result in oscillation as the spray boom system 100 seeks a designated target boom wing positioning. However, relatively slow responsiveness of the boom system 100 as a whole, in the illustrative examples, does not impede the actuator controller 204, incorporating an underdamped control output, quickly/precisely controlling actuators of the boom wings to transition boom wings from a current position to a target position that is either commanded by the main controller 202 or necessitated by encountering an obstacle—necessitating an emergency/safety response autonomously by the actuator controller 204.

Importantly, the cascaded control arrangement carried out by the main controller 202 and the actuator controller 204 facilitates configuring the degree of damping applied in the actuator control scheme implemented by the actuator controller 204 (in accordance with performance characteristics of the controlled actuators) independently of a degree of damping applied in the main controller 202 control configuration that may be established with respect to operating condition and performance conditions of the spray boom system 100 as a whole. Thus, two distinct degrees of damping may be specified in a cascaded control arrangement carried out by the main controller 202 (executing a boom wing positioning control scheme and providing repositioning commands based upon an error between current/target wing positions) and the actuator controller 204 (executing an actuator control arrangement to cause repositioning of actuators of the left wing 102*a* and the right wing 102*b* in accordance with the repositioning commands issued by the main controller 102).

By way of a particular example of the advantage of the above-described two-part/cascaded spray boom control arrangement schematically depicted in FIG. 2, the control arrangement advantageously implements a dynamic wing control (discussed in detail herein below) that takes into consideration a cross-interaction between the left wing 102*a* and the right wing 102*b* of the multi-wing spray boom assembly 100. For example: lifting the left wing 102*a* upwards induces a tipping of the boom assembly 100 that causes a tipping of the right wing 102*b* (see FIG. 1C). Such tipping and resulting effect on the opposing wing arises from the relatively high mass and inertial moment of the originally actuated/raised wing. The control arrangement described herein (including two distinct control loops implemented separately by the main controller 204 and the actuator controller 202) is able to accommodate and compensate cross interactions between the boom wings, thereby facilitating fast, yet smooth and accurate, transitions between current and targeted boom positions without inducing/experiencing system oscillations or instability.

The main controller 202 incorporates a variety of configuration/adaptation features. The main controller 202, by way of example, incorporates a well known sliding mode control. The sliding mode control is a nonlinear control that, in a particular illustrative example, is incorporated into the main controller 202 for use in conjunction with a physical model of a spray boom system (e.g. boom assembly 100) to control the system in a predetermined way. An advantage of augmenting the sliding mode control with the model based control of the spray boom system 100 described herein is its robustness (in its ability to accommodate a vast variety of changes to terrain beneath potentially very large spray boom systems having very wide wing spans and avoidance of swinging/oscillating of one or more of the boom wings during operation. Moreover, in an illustrative implementation, the operation of the main controller 202 is enhanced by use of state feedback, provided by the state observer 212, in calculations made by the main controller 202 as part of the sliding mode control. However, acceptable operation of the main controller 202 is achievable without using state feedback as well as by only using state feedback provided by the state observer 212.

In accordance with the illustrative example provided in FIG. 2, the actuator controller 204 generally controls operation of controlled system elements (i.e. actuators), and as such may operate a relatively fast downstream control loop (of the cascaded control loop arrangement) to precisely and accurately control actuator (e.g. hydraulically actuated piston/cylinder systems) state, of each of the above-described actuators (see FIG. 1 described above) in accordance with an actuator repositioning commands received from the main controller 202. By way of example, the actuator controller 204 is able to carry out a downstream control loop causing precise repositioning of an actuator (e.g. hydraulic cylinder/piston) having a relatively fast response in comparison to a relatively slow response of the multi-wing spray boom assembly 100 controlled by the main controller 202 executing an upstream control loop to render the actuator repositioning commands provided to the actuator controller 204 that executes the repositioning commands on individual actuators of the boom assembly 100 in accordance with the cascaded control arrangement.

Thus, in accordance with a cascading control arrangement, the actuator device control is carried out as a downstream control (of the illustrative cascade control arrangement) by the actuator controller 204 in accordance with actuator repositioning (set point, delta, etc.) commands/instructions determined and passed downstream by the main controller 202. As such, the actuator controller 204 operates the downstream control loop (of the cascaded upstream/downstream cascaded control loop pair) on controlled components (i.e. actuators) that respond significantly faster to forces acting on the controlled components than the boom assembly 100 having a significantly greater controlled mass/inertia. As such, the cascaded control loop arrangement facilitates a decoupling of: (1) determining actuator position set points (or differences/deltas between current and target set points), and (2) causing the actuators to transition to the new set points (thus transitioning positions of the boom wings (e.g. boom wings 102a and 102b) to corresponding desired position set points. Such decoupling of the two control loops, in the cascaded control arrangement provided herein, avoids introducing nonlinearities—caused, for example, by the actuating of multiple hydraulic valves—that would otherwise be present if direct actuator control was carried out by the main controller 204 control loop that issues set points for the actuators.

Moreover, the separation of the overall control of the spray boom assembly positioning into cascaded control loops including an upstream control loop (actuator set point determination) and a downstream control loop (controlling physical actuators to achieve the specified actuator set points over a period of time in accordance with physical limitations of specific actuator systems and boom geometries and configurations) reduces the complexity of the upstream loop carried out by the main controller 202 while significantly increasing customizability, configurability, robustness and performance of the complete controller arrangement. By way of example, the actuator controller 204 could implement a simple/known proportional gain algorithm that is enhanced by incorporating a Smith predictor and valve profile compensation. With reference to the illustrative example provided in FIG. 1, the actuator controller 204, in accordance with a downstream control role in the overall cascaded control arrangement, issues control signals to the actuators 112a, 112b, 114a and 114b for the left wing 102a and the right wing 102b, and the lift actuator 110 and boom tilt actuator 116 (for the boom assembly 100 as a whole) to affect repositioning of the actuators in accordance with the received actuator repositioning commands, to reduce/eliminate the boom wing positioning errors determined by the main controller 202.

A spray boom wing actuators 206 component, in the control architecture schematic provided in FIG. 2, corresponds to a multitude of spray boom assembly-related actuators (e.g. actuators 112a, 112b, 110, 116, 114a and 114b in FIG. 1, and more specifically hydraulically actuated piston systems) such as the multitude of actuators depicted, by way of example, in FIG. 1. By way of example, output from the actuator controller 204 causes opening and closing of hydraulic cylinder valves of the piston systems to affect lifting/lowering of individual spray boom wings/wing tips as well as lifting and rotating the entire spray boom assembly 100 in accordance with the illustrative arrangement depicted in FIG. 1.

While the illustrative example in FIG. 1 provides a spray boom assembly 100 comprising a plurality of actuators in the form of hydraulic pistons operating on hinged joints, the control arrangement may be implemented in association with a variety of physically reconfigurable spray boom assemblies having any of a variety of suspensions including: pendulum, trapezium, cable-roller, etc.

Moreover, while hydraulic cylinder-based actuators systems are specifically mentioned above, other actuator types are contemplated such as: pneumatic, electrical (e.g. stepper motors and linear actuators), mechanical, etc.

The type of signal received by the boom component actuators, similarly, can be any of a variety of signals including: analog (level), digital, pulse-width (modulation), one off (e.g. an on/off signal), etc.

In the illustrative example, a boom sensors data 210 provides an actual position of individual boom wings affected by the actuation signals/commands issued by the actuator controller 204 to the spray boom wing actuators 206. By way of example, the boom sensors data 210 provides one or more of the following examples of boom wing position data types: boom tilt, boom tilting speed (i.e. rate of rotation of the entire boom assembly upon a central pivot point); left wing rotation; right wing rotation; left wing tip angle (with respect to a hinge point between the wing and central section of the spray boom assembly 100); and right wing tip angle.

The boom sensors data 210 corresponds to any sensor (signal) data type providing an output value that is not related to detecting the field (crop/ground). The boom sensors data 210 provides information relating to a current physical configuration of each wing of the multi-wing boom assembly 100 (e.g. boom shape and behavior, as well as possible disturbances). Depending on the sensor type, the measurement could be directly used by the main control 202. Examples of boom sensor data 210 types include: actuator position sensor (length measurement) for the tilt cylinder, actuator position sensor (length measurement) for the left wing cylinder, actuator position sensor (length measurement) for the right wing cylinder, and gyroscope on the center frame. Additionally and/or alternatively, boom sensors data 210 may include the following types: distance sensors, angle sensors (e.g., inclinometer), speed sensors, rotational speed sensors (e.g. gyroscope), acceleration sensors (e.g., accelerometer), rotational acceleration sensors, barometric pressure sensors—(providing a height measurement), and magnetometers.

The contour sensors data 208 provides data indicating a current distance between a sensor mounted at a known position on the boom assembly (e.g. at a known lateral position along one of the boom wings). By way of example, the contour sensors data 208 comprises data provided by, for example, ultrasonic sensors mounted at known distances along one of the left wing 102a and the right wing 102b. Any of a variety (and quantity) of sensor types are contemplated in accordance with various implementation of the boom control arrangement described herein. Other sensor types providing the contour sensors data 208 include: radar, lidar, camera, barometric pressure, etc. Other, multipoint measurements can be obtained, for example, by: 2d radar, 2d LIDAR, 3d LIDAR and camera. The spray boom assembly 100 can be used to sense and adjust a boom geometry in any of a variety of field types including, for example, bare ground, small crops, tall crops, sparse/dense vegetation, fields having a highly non-uniform shape (e.g. potato fields), vineyards.

Additionally, control implementation at the main controller 202 and/or the actuator controller 204 is enhanced by providing any of a wide variety of data relating to the controlled components, including: measurements of the hydraulic circuit components (e.g., pressure, flow, valve state); measurements of non-boom components (e.g., sprayer chassis, intermediate frame, connected springs and/or damping elements/structures, tractor equipment, rotation speed sensors (e.g., gyroscope); and tractor data (e.g., oil flow/pressure, enabled hydraulic functions, geospatial position, vehicle speed. Such measurements facilitate determining disturbance variables acting on the system, which can be utilized to increase control performance.

The state observer 212 (based on the sensor types that are used) provides additional processing of the sensor output signals to render an accurate representation of the current state of the multi-wing spray boom assembly 100 for the main controller 202 to carry out the primary (slow) control loop of the dual fast/slow control loop arrangement carried out by the main controller 202 and the actuator controller 204. Thus, in addition to preprocessing the raw data streams using filtering algorithms, an observer can be used to render a more robust status determination by way of example, the state observer 212 is a Luenberger observer. However, the state observer 212 may implement Kalman filters or any of a wide variety of higher level processing of raw sensor data to render a generalization/characterization of the current state of the multi-wing spray boom assembly 100 (or individual components thereof).

Importantly, the control arrangement described herein is intended to be construed broadly and without significant bounds with regard to implementing the disclosure in a variety of spray boom assembly application environments. Moreover, while including a lift/lower control can indeed be incorporated into the described control scheme, the disclosed control arrangement can be implemented without such control. Instead, the control is intended to primarily focus upon raising/lowing specific sections of the spray boom assembly 100 in accordance with sensed variations in operating conditions of the spray boom assembly 100.

Having described a control arrangement for carrying out boom wing leveling, an exemplary set of operations carried out by the main controller 202 and the actuator controller 204 are described herein below with reference to FIGS. 3-6.

Figure 3:
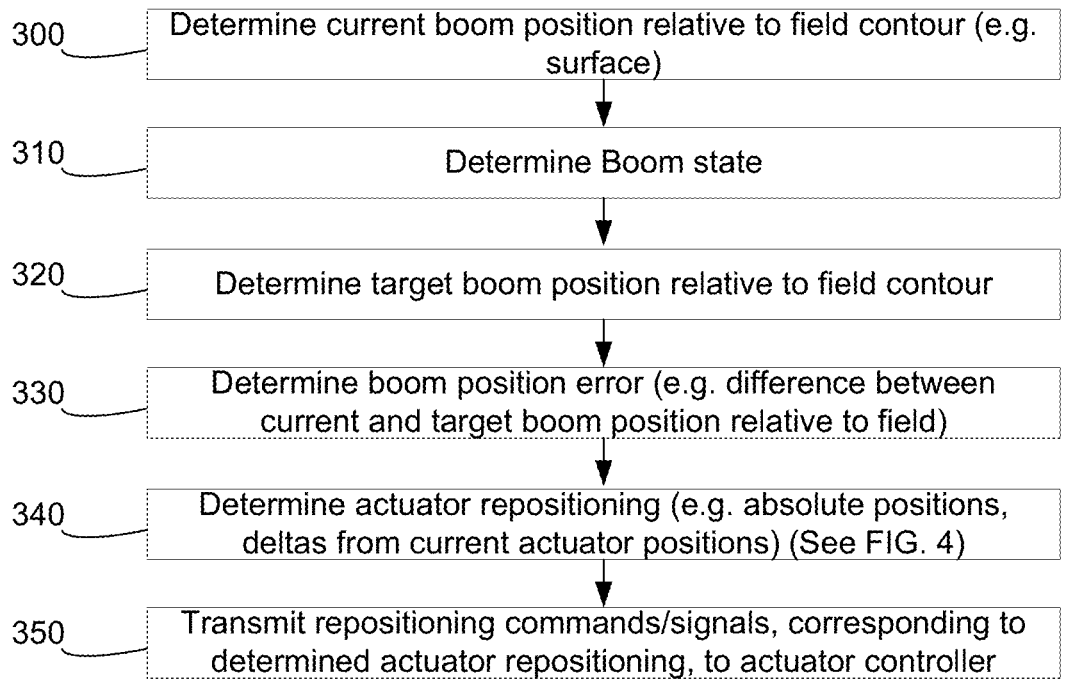
FIG. 3 is a flowchart summarizing a simple/simplified main control loop in accordance with an illustrative example.

Turning to FIG. 3, a flowchart summarizes operations carried out by the main controller 202 for an exemplary method of acquiring and processing a set of raw data points, in accordance with the control arrangement described herein above with reference to FIG. 2. In accordance with the illustrative example, during 300, the main controller 202 determines a relative position of the left wing 102a and the right wing 102b of the multi-wing spray boom assembly 100 in relation to (e.g. distance from) a field contour (e.g. the ground surface of a field). However, the field contour may be established by a top of crops or any other reference contour of interest. In the illustrative example the boom position relative to the field contour is determined based upon an analysis of contour (e.g. ground-to-sensor distance, crop top-to-sensor distance, etc.) input data provided by the contour sensors 208.

Thereafter, during 310 the main controller 202 determines a state of the middle section 102c, a rotation speed of the middle section 102c, a state of the left wing 102a and a state of the right wing 102b of the multi-wing spray boom assembly 100 based upon an analysis of input boom mid-section wing position data provided by the boom sensors 210.

During 320 the main controller 202 determines a target position of the left wing 102a, the middle section 102c and the right wing 102b of the multi-wing spray boom assembly 100—more particularly the spray nozzles 206 mounted thereon—relative to a sensed contour beneath the left wing 102a and the right wing 102b. By way of example, the target boom position is provided by the contour reference data 214 based upon a current sensed position of the boom assembly 100 in a (crop) field. Additionally, in accordance with an illustrative example, a choice among many potentially available target boom positions provided by the contour reference data 214 is based upon the state of the left wing 102a and the right wing 102b established during 310.

Based upon the combination of inputs obtained during operations 300, 310 and 320, during 330 the main controller determines a boom wing and mid-section positioning error. In accordance with a current illustrative example, the boom position error is a difference between: (1) the current positions of the left wing 102a and the right wing 102b of the multi-wing spray boom assembly 100 established during 300; and (2) the target boom positions established during 320 (informed by a boom state obtained during 310). As such, during 330 the main controller 202 determines repositioning of actuators to move the boom wings 102a and 102b into new positions such that the current boom position will converge to the target boom position in relation to a contour of interest (e.g. a ground or crop-top surface). The contour error can be rendered in any of a variety of forms. By way of example, the boom wing positioning error relates to a number of degrees of rotation for either of the wings 102a and 102b, and/or the boom assembly 100 itself (at a single point of rotation) to reconfigure the geometry and/or orientation of the boom assembly 100. The boom positioning error, by way of a further example, may also specify an amount to raise/lower the boom assembly 100 using the lift actuator 110.

Thereafter, at 340 the main controller 202 applies known relationships between actuation (e.g. extension/retraction) of boom assembly wing elevators/actuators (e.g. hydraulically actuated pistons) and resulting absolute positioning of the left wing 102a and the right wing 102b of the multi-wing spray boom assembly 100 to minimize/eliminate the boom wing positioning error determined during 330.

During 350 the main controller 202, in accordance with the above-described two-loop cascaded control arrangement, transmits appropriate actuator repositioning (e.g. extension/retraction) commands to the actuator controller 204 to cause the actuators of the left wing 102a, right wing 102b and the boom assembly 100 to modify the positions of the wing/boom components to carry out an adjustment in accordance with repositioning commands arising from the calculations performed by the main controller 202 during 340.

The set of operations are performed, in general, as a control loop (though order of operations is not necessarily adhered to, and some operations may be repeated several times for each executed control loop/cycle completed by the main controller 202

Figure 4:
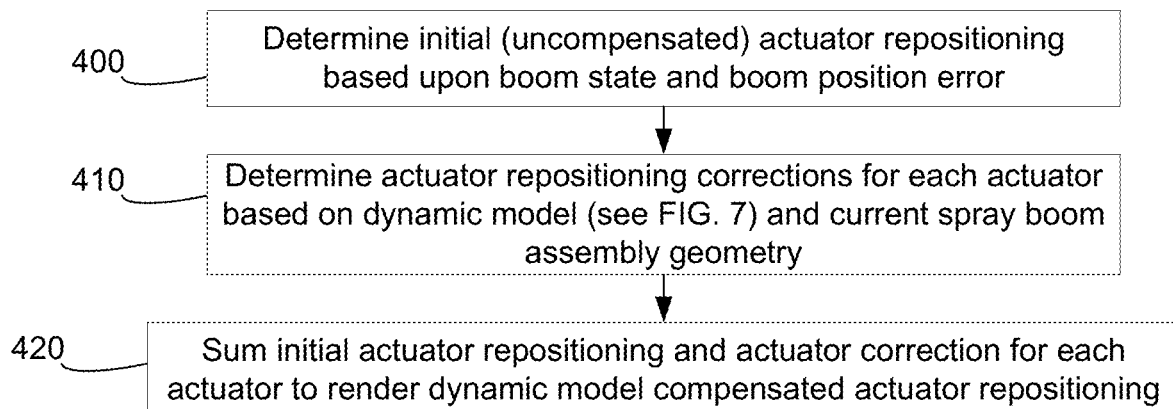
FIG. 4 is a flowchart summarizing a details of the main control loop determination of a contour error signal used to generate a cylinder actuation control signal to the cylinder controller in accordance with an illustrative example.

Turning to FIG. 4 a flowchart summarizes details of the main controller 202 upstream control loop operations performed during 340 to generate actuator repositioning in accordance with a dynamic model (see FIG. 7) of the boom assembly 100 described in detail herein below by way of an illustrative example. During 400, the main controller 202 determines an initial set of uncompensated actuator repositioning values for changing the state of the wing actuators (e.g. actuators 112a, 112b, 114a and 114b) to reduce/eliminate the determined boom position error established during 330.

Thereafter, during 410, the main controller 202 determines actuator repositioning corrections for each actuator based upon the dynamic model of the boom assembly 100 and including the current spray boom orientation (and the wings thereof).

Thereafter, during 420, the main controller 202 sums the initial repositioning and correction repositioning values for each actuator to render a full set of dynamic model-compensated actuator repositioning for each one of the set of actuators on the boom assembly 100 (e.g. actuators 112a, 112b, 114a and 114b in FIG. 1). As such, upon completion of operation 340 (including the dynamic model compensation of FIG. 4), a set of dynamic model compensated actuator repositioning values are provided for the set of actuators 112a, 112b, 114a and 114b.

Figure 5:
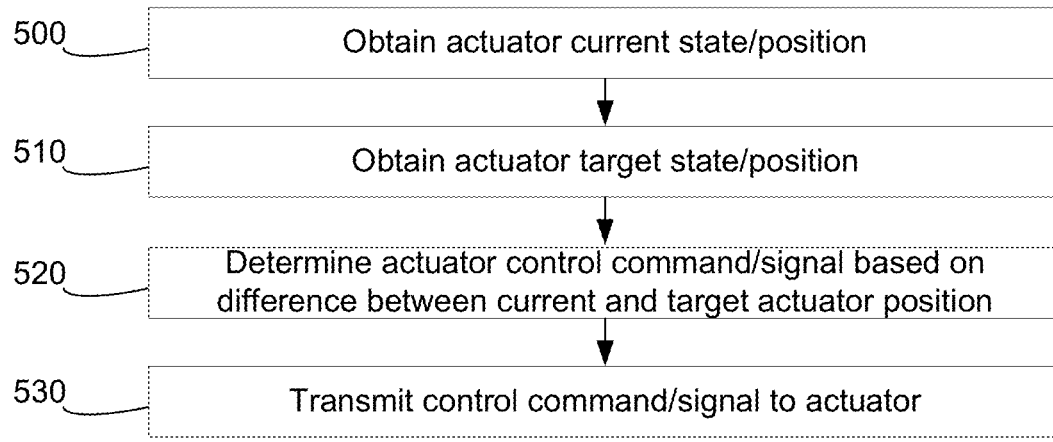
FIG. 5 is a flowchart summarizing a simple/simplified boom actuator control loop in accordance with an illustrative example.

Turning to FIG. 5 a flowchart summarizes a simple/simplified boom actuator control loop carried out by the actuator controller 204 (in a downstream cascaded controller role in relation to the main controller 202 providing actuator repositioning commands in an upstream controller mode of a cascaded control loop pair) in accordance with an illustrative example. During 500 the actuator controller 204 obtains an actuator current state/position by analysis of boom sensors data 210 for each of the actuators 112a, 112b, 110, 116, 114a and 114b.

During 510 the controller 204 obtains/retrieves target state/position data for each of the actuators 112a, 112b, 110, 116, 114a and 114b. Such target state/position data corresponds to target actuator positioning instructions provided within the repositioning commands/signals provided during 350 by the main controller 202 to the actuator controller 204. During 520 the actuator controller 204 determines actuator control command/signals based upon at least a difference between current and target states/positions determined for each of the actuators 112a, 112b, 110, 116, 114a and 114b. Optionally, the actuator control command/signals are further established based upon a history of previously issued actuator commands (providing a degree of damping/filtering/smoothing to determination of an actuator command issued to a particular one of the actuators 112a, 112b, 110, 116, 114a and 114b during each iteration of a control loop (depicted in FIG. 5) carried out by the actuator controller 204. During 530 the actuator controller 204 issues actuator commands/signals to each of the actuators 112a, 112b, 114a and 114b.

Figure 6:
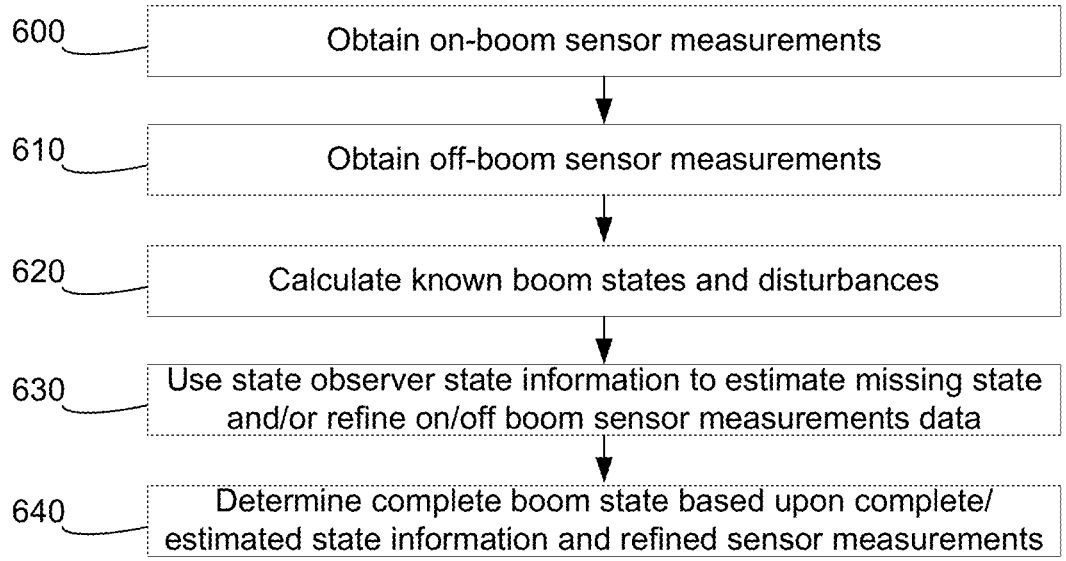
FIG. 6 is a flowchart summarizing an exemplary set of operations carried out by the control arrangement to obtain measurements from sensors and a state observer input in accordance with an illustrative example.

Turning to FIG. 6 a flowchart summarizes an exemplary set of operations carried out by the control arrangement to obtain measurements from sensors and a state observer input in accordance with an illustrative example. During 600 the main controller 202 obtains on-boom sensor measurements (corresponding to the boom sensors data 210) indicative of a current physical configuration of the various physical sub-components (e.g. wings 102a and 102b) of the boom assembly 100.

During 610 the main controller 610 obtains off-boom sensor measurements. For example, during 610 the main controller 202 obtains measurements of various parameters related to a geospatial (three-dimensional) shape of the field/crop (e.g. changes in a slope of the hill along the length of the boom assembly (orthogonal to the direction of travel).

During 620 the main controller 202 calculates known boom states and disturbances using the measurements obtained in 600. Depending on the sensor arrangement, this step can provide anything from 0 states to all states of the system.

Thereafter, during 630 the main controller 202 obtains missing states. By way of example, the main controller 202 obtains missing state information from the state observer 212 that calculates such information using a Luenberger observer to estimate the missing states.

During 640, the main controller combines the state and sensor measurements information acquired during 620 and 630 to provide a complete state of the machine as well as known disturbances (e.g. a sensed rotation arising from a tipping of the boom assembly 100. This information is used in the decision making of the main controller 202 during, for example operations 320 and 340.

Figure 7:
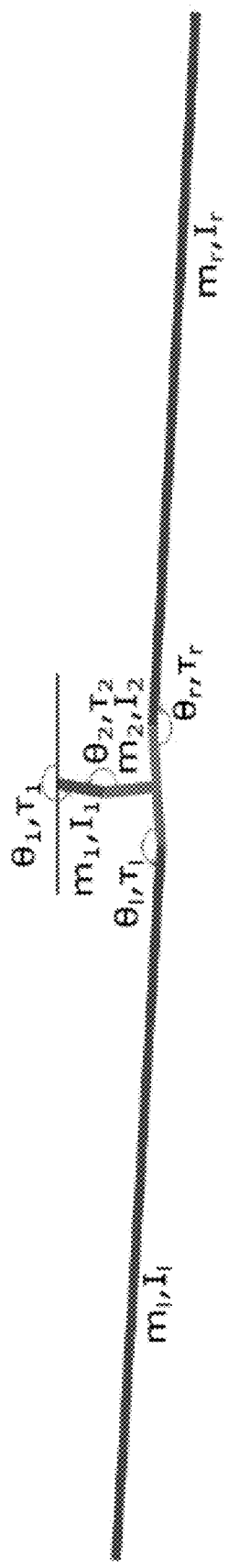
FIG. 7 depicts a pendulum model for a two-wing (and single mid-section) spray boom assembly used by the main controller to perform dynamic control calculations in accordance with an illustrative example.

Turning to FIG. 7, a pendulum-based model is depicted for a two-wing (and single mid-section) spray boom assembly used by the main controller 202 to perform dynamic control calculations in accordance with an illustrative example. FIG. 7 depicts a simplified schematic overview of the spray boom assembly 100 depicted in FIG. 1A. The depicted pendulum-based model of the boom assembly 100 includes four components, identified in the diagram using four distinct subscripts "i" taken from the group consisting of four distinct labels (1, r, 1 and 2) corresponding to each of the four distinct components of the model. In accordance with the pendulum model for the spray boom assembly 100, movement of the boom 100, relative to a trailer frame or sprayer chassis of a tractor (carrying the boom assembly 100), can be described by 4 angles $\theta_i$. On those angles $\theta_i$, there are corresponding torques $\tau_i$. The components themselves have masses $m_i$ and inertia $I_i$. To obtain the dynamic model (i.e. when parts are moving), the angles and their time derivatives are considered (speed and acceleration). These angles can, where applicable, be linked to actuator displacements (in this case through trigonometry). The torques consist of multiple components: actuator actuation forces, friction, damping, springs, gravity, etc. Also constraints can be taken into account, e.g. actuator range of motion, motion stoppers etc. Using this information, a system of equations can be setup that describes the dynamic behavior of the boom in this simplified form (in this case using Euler-Lagrange equations).

Figure 8:
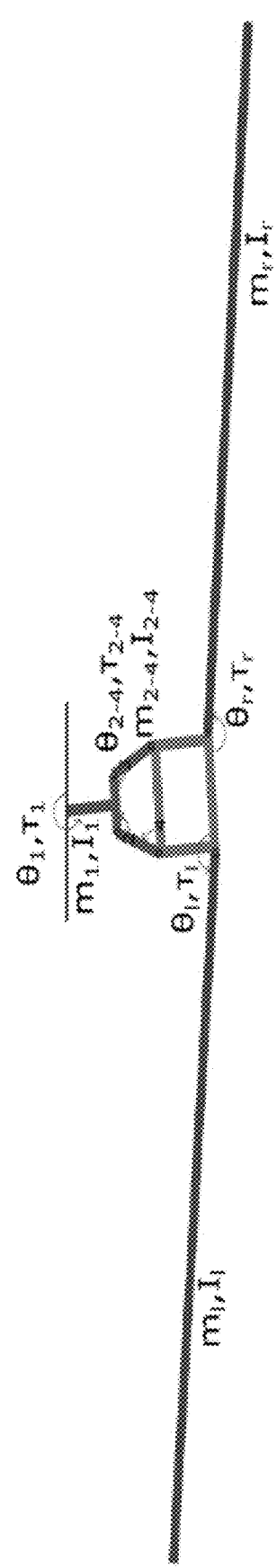
FIG. 8 depicts a trapezium model for a two-wing (and single mid-section) spray boom assembly used by the main controller to perform dynamic control calculations in accordance with an illustrative example.

Turning to FIG. 8, an alternative, trapezium-based model is depicted for a two-wing (and single mid-section) spray boom assembly. The trapezium-based model differs from the pendulum-base model of FIG. 7 in that the mid-section 102c is modeled as a trapezoid hanging from a fixed point of rotation—instead of a horizontal bar and vertical bar joined at one end to the horizontal bar.

Dynamic Model-Based Compensating Repositioning Commands of Main Controller 102

In accordance with an illustrative example, the main controller 202 incorporates a dynamic model for controlling actuation of wings 102a and 102b and the boom assembly 100 as a whole. By way of example, the main controller 202 uses a model based on Euler-Lagrange equations (or Virtual Work) and knowledge of the boom assembly 100 composition (mass, dimensions, etc.). The equation, by way of example, takes into consideration: component mass, component inertia, component dimensions (2D), forces acting on/accelerating the components, gravity, spring constants, flexing/bending, damping, friction, etc.

The mechanical models applied to and incorporated within the mathematical operations and tunable parameters thereof, are established and refined according to experimentation on various models of the boom assembly 100. One such example of a tunable parameter value is friction. By way of example, the mechanical model comprises a state space equation with eight (8) state variables: trailer/attachment point to subframe angle, trailer/attachment point to subframe angular speed, subframe to center frame angle, subframe to center angular speed, left boom wing angle, left boom wing angular speed (pivoting up/down under force of the actuator), right boom wing angle, and right boom wing angular speed.

The model further includes three (3) manipulated inputs: tilt cylinder force, left boom wing cylinder force, and right boom wing cylinder force.

Other inputs to the dynamic model implemented, by way of example, by the main controller 202 include: disturbance inputs and absolute trailer/mounting assembly rotation.

The need to have precise knowledge of cylinder forces may necessitate taking extra measurements and having precise knowledge of the hydraulic circuit. On the other hand, by using the downstream control-loop carried out by the actuator controller 204, of the cascaded controller arrangement, to precisely control the position of the actuators 112a, 112b, 110, 116, 114a and 114b (e.g. hydraulically actuated cylinder/piston systems), the inputs can be converted from force inputs to position inputs (provided by the main controller 202 to the actuator controller 204). By way of example, a state-space model can be converted appropriately, resulting in a dynamic model comprising:

A. Two (2) state variables of interest: (1) trailer/attachment point to subframe angle, and (2) trailer/attachment point to subframe angular speed, and B. Four (4) manipulated input variables: (1) Subframe to center frame angle, (2) Left boom wing angle, (3) Right boom wing angle, and (4) boom height (at mid-section 102c) in relation to mounting point.

The two state variables can be transformed to represent different angles and angular speed, such as the total boom inclination and total boom angular speed.

This state-space equation can be expanded by the representative model for the downstream cascade loop, which is very much simplified compared to complete modeling of the hydraulic behavior in the current illustrative example.

The resulting state space system comprises:

A. Six (6) state variables of interest: (1) Total boom angle, (2) Total boom angular speed, (3) Tilt cylinder position, (4) Left boom wing cylinder position, (5) Right boom wing cylinder position, and (6) height cylinder position, and B. Four (4) manipulated input variables (which will be sent to the cascade's downstream loop): (1) Tilt cylinder position reference, (2) Left boom wing cylinder position reference, (3) Right boom wing cylinder position reference, and (4) Height cylinder position reference.

Main Controller 202 Operation

To facilitate the main controller 202 implementing a dynamic model-reference sliding mode control, a model representation of the multi-wing spray boom assembly 100 system (see FIGS. 7 and 8 discussed herein above) is provided, for example, in state space format. Additionally, an ideal/desired model behavior, sliding mode parameters, and an estimation on the noise and disturbances to the system are specified.

The model itself is discussed above. Regarding the ideal/desired model behavior, it is possible to control the system through state space feedback, which is a linearized control technique that is susceptible to unmodeled dynamics or nonlinearities, amongst other things. The current system of interest (the multi-wing spray boom assembly 100) is subject to a multitude of disturbances and nonlinear influences. Therefore, a state space feedback controller is used to determine the ideal/desired model behavior, while the sliding mode control will assure the actual machine is approaching the ideal/desired model behavior.

Regarding state space feedback with direct eigenstructure assignment, a state space feedback matrix F is used in an input equation u=Fx+Gr, with x the states of the machine. F is determined through direct eigenstructure assignment. This involves the following choices: Eigenvalues of the closed loop system, or Eigenvalues and Eigenvectors of the closed loop system.

Eigenvalues are used to provide state space feedback. However, adding the eigenvectors as a design parameter creates new possibilities. This adaptation to the operation of the main controller 102 upstream control loop should deal with the dynamic behavior of the boom. One such attribute of this system is the cross-interaction. Through eigenstructure assignment, the closed loop behavior of the boom assembly 100 level control system can be tuned so these effects are maximally limited.

The other term of the input, Gr, is determined by reference input r which will be the contour (or contour error) that the boom should follow. This is shaped by matrix G to align the applied reference with the corresponding output values.

Sliding Mode Parameters

To match the spray boom with the idealized model, sliding mode control is used. Several design possibilities are possible: Robust eigenstructure assignment, Quadratic minimization (used here), and Direct eigenstructure assignment (a similar approach as in the state space feedback case)—to name just a few of the many possibilities.

A typical approach in sliding mode control is to split the resulting input signal coming out of the controller as a linear and nonlinear component. This nonlinear component is scaled to overcome the known and unknown uncertainties in the system. This sliding mode control approach is sufficient that the state space feedback component and the reference feedforward Gr are not essential. It is however sensible to split the control effort this way, as they consist of known signals.

Figure 9:
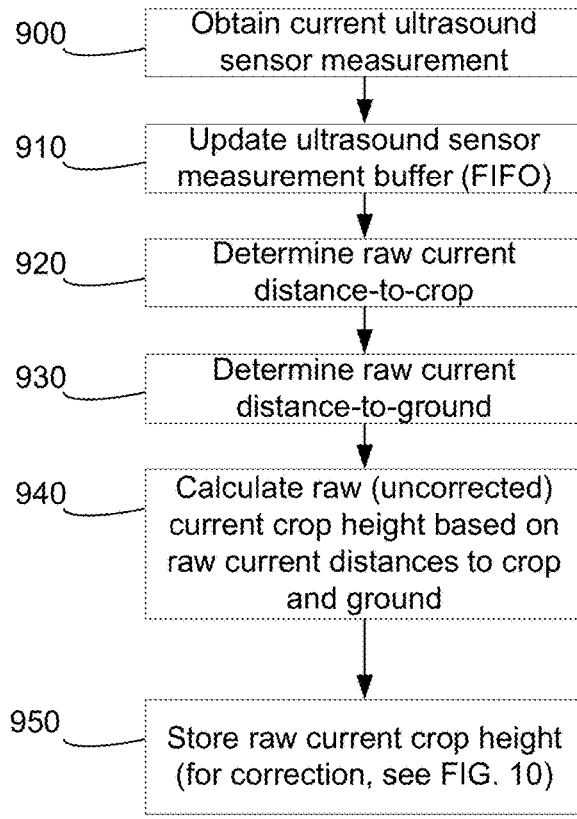
FIG. 9 is a flowchart summarizing operations for obtaining a raw current crop height in accordance with an illustrative example.
Figure 12:
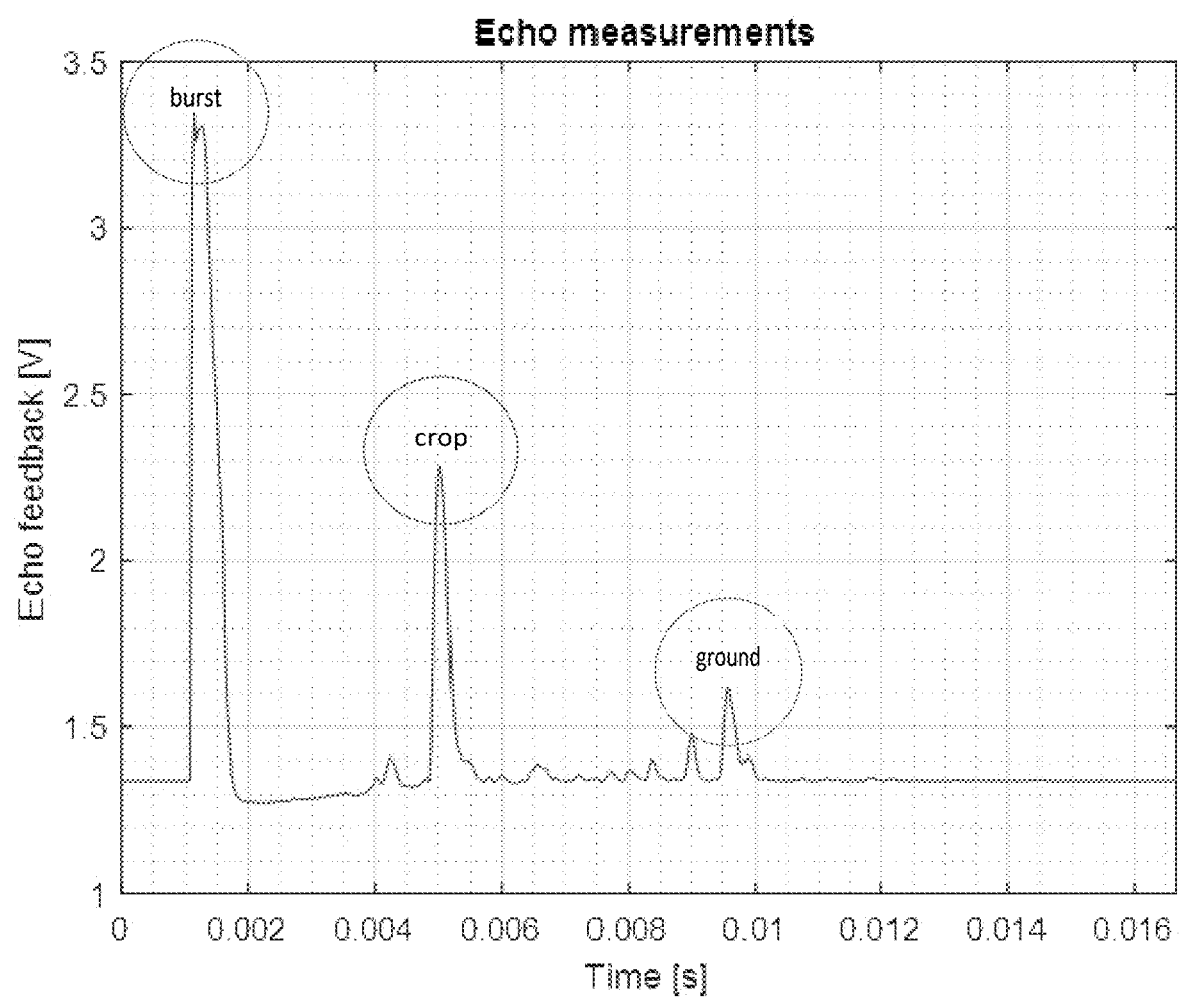
FIG. 12 is chart providing an illustrative example of an ultrasound sensor signal with respect to time for a multi-sense arrangement (crop and ground) in accordance with an illustrative example.

Turning to FIG. 9, a flowchart summarizes, by way of example, operations carried out by the main controller 202 for obtaining a raw current crop height based upon received sensor signals (e.g. ultrasound) indicative of a currently sensed distance between a sensor mounted on the boom assembly 100 (e.g. sensor 108a). By way of example, the provided sensor signals are rendered by a sensor that provides a single distance measurement value for each reading cycle—more particularly, the sensor is an ultrasound sensor that provides a distance corresponding to the first received echo of an emitted pulse. However, in an alternative arrangement illustratively depicted in FIG. 12, the provided sensor signals are rendered by a sensor that provides multiple (e.g., two) distance measurements based upon sensed peaks of an ultrasound echo signal (corresponding to "crop top" and "ground" distances) for each emitted ultrasound burst. With continued reference to FIG. 12, the echo signal arising from a single burst (excitation) signal can be fed to a double Kalman filter to render: (1) a distance to crop top—corresponding to the first detected peak (meeting a signal magnitude, duration, prominence, etc. for a crop top profile); and (2) a distance to ground—corresponding to a second detected peak (meeting a signal magnitude, duration, prominence, etc. for a ground profile). The above-described multi-distance sensing arrangement is only one particular example of an alternative arrangement for acquiring/generating input distances for carrying out a boom level control in accordance with illustrative examples provided herein In the illustrative example, the distance sensor is an ultrasonic sensor that provides a single distance measurement corresponding to a shortest distance sensed between the sensor and an object within a sensing volume. By way of example, the operations summarized in FIG. 9 are performed approximately 100 times per second. However, other sampling rates are contemplated. Additionally, a queue (FIFO buffer) is maintained of the last 64 raw measurement values (stored during operation 950 discussed herein below). The history of distance sensor raw measurement values, in combination with processing of such signals to provide a historical crop height estimate (described herein), facilitates making informed decisions with regard to whether a current distance sensor measurement corresponds to the top of the crop or the ground for purposes of determining a raw current crop height. Additionally, in accordance with illustrative examples, the main controller 202 may also maintain a history of past values for measured distance to crop, measured distance to ground, averaged/filtered distances, etc. There are no intended limits on the type, frequency, duration, etc. of saved historical data (maintained in any of a variety of data structure types including queues, stacks, etc.

During 900, the main controller 202 obtains a current distance measurement from an ultrasound sensor. The ultrasound sensor measurement indicates a distance between the sensor and a sensed physical feature below the boom assembly 100. The distance is rendered, for example, by providing the ultrasound signal to a Kalman filter to render a distance to crop or ground—or in the case of a double Kalman filter, distances to both crop and ground.

During 910, the main controller 202 stores the current ultrasound sensor distance measurement at the head of a current distance measurement queue (e.g. a 64 element FIFO buffer). The ultrasound distance measurements stored in the current distance measurement queue can represent top-of-crop, ground, anything in between or even invalid (e.g. no echo received). The remaining operations summarized in FIG. 9 relate to a calculation of a raw estimate of current crop height based upon an application of decision logic to the history of (64) previous distance measurements stored in the current distance measure queue.

During 920, the main controller 202, based upon the contents of the current distance measurement queue, determines a raw current distance-to-crop. By way of example, the raw current distance-to-crop is selected as the shortest distance measurement of the 64 measurements stored in the current distance measurement queue. Similarly, during 930, a raw current distance-to-ground is selected as the largest distance measurement of the 64 measurements stored in the current distance measurement queue. The above examples for determining current distances, for purposes of establishing a current raw crop height are exemplary in nature and are not intended to limit the disclosure in its broadest aspects.

Thereafter, during 940, the main controller 202, based upon the raw current distance-to-crop and raw current distance-to-ground values established during 920 and 930, calculates a raw (uncorrected) current crop height by subtracting the current distance-to-crop from the current distance-to-ground. During 950 the raw current crop height is stored for further processing (during the operations of FIG. 10).

Figure 10:
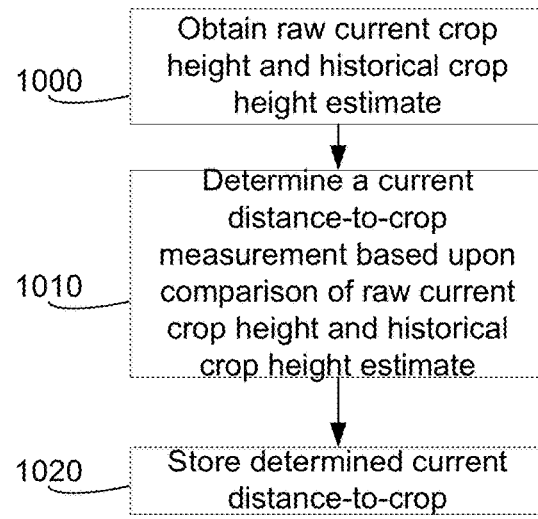
FIG. 10 is a flowchart summarizing operations for obtaining a corrected current crop height in accordance with an illustrative example.
Figure 11:
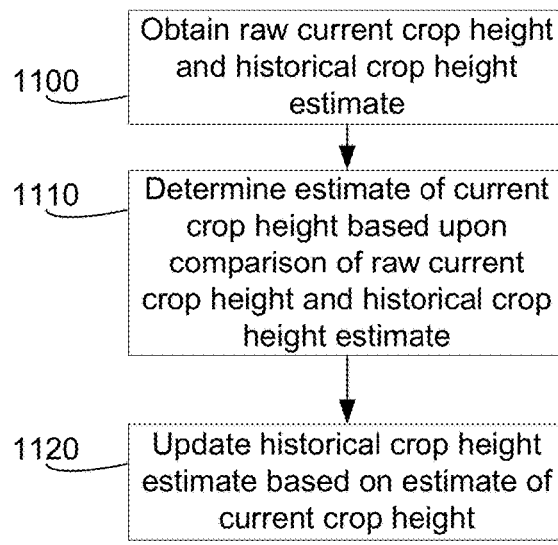
FIG. 11 is a flowchart summarizing operations for updating a historical crop height estimate in accordance with an illustrative example.

Turning to FIG. 10, an exemplary set of operations is summarized for rendering a current distance-to-crop measurement based upon a comparison of the raw current crop height stored during 950 and a historical crop height maintained by the main controller (see e.g. FIG. 11 discussed herein below). During 1000, the main controller 202 obtains the raw current crop height (stored during 950) and the (long term) historical crop height estimate (see e.g., FIG. 11 described herein below). Thereafter, during 1010 the main controller 202 compares values of the raw current crop height and the historical crop height estimate to render a decision regarding whether to keep or reject the raw current crop height for purposes of providing a current distance-to-crop value for a particular one of the distance sensors that drives distance-to-crop control carried out by the main controller 202 with regard to the boom assembly 100 and the individual wings thereof. As such, the flowcharts of FIGS. 9, 10 and 11 represent the operations performed for each of the ultrasound sensors—that individually provide a separate distance measurement for use by the main controller 202 in an overall boom leveling control arrangement. For example, a current filtered distance-to-crop measurement for each physical sensor position on the boom assembly 100 is applied by the main controller 202 to a boom geometry configuration action determiner logic to render a target boom geometry. Such logic could, for example, specify a particular range of target distance-to-crop values for each distance measurement position on the boom assembly 100. The current distance measurement at each sensor position on the boom may also be compared to identify outlier distance measurements indicative of potentially exceptional circumstances (e.g. sensor malfunction, change in terrain, edge-of-field, etc.).

By way of a particular example, during 1010, the main controller 202 determines whether the raw current crop height exceeds a minimum distance calculated as a fraction/percentage of the historical crop height estimate. If the raw current crop height exceeds the minimum, then a current distance-to-crop is established based upon the raw current distance-to-crop established during 920. Otherwise, the current crop-to-distance is established using the historical crop height estimate. More particularly, the current distance-to-crop is calculated using the raw current distance-to-ground and the historical crop height estimate. During 1020, the main controller stores the current distance-to-crop established during 1010.

Turning to FIG. 11, a summary is provided of exemplary operations for maintaining the historical crop height estimate (used during the operations of FIG. 10). In particular, during 1100, the main controller 202 obtains the raw current crop height and the historical crop height estimate. During 1110 the main controller 202 renders an estimate of current crop height based upon currently available sensor readings and historical crop height estimate. During 1110, the main controller, in effect, determines whether the current set of sensor measurements maintained by the sensor measurement queue (FIFO buffer) corresponds to measurements taken over crops. Based on the determination (the sensor is measuring ground distance instead of crops for several sensor readings), the current distance measurement may be replaced by an estimate of current crop height derived from the (filtered) historical crop height estimate. Using this scheme, the measurements provided to the leveling algorithm are a more intuitive representation of appropriate target positions for the main controller 202 determining boom leveling control.

During 1110 the main controller 202 compares values of the raw current crop height and the current historical crop height estimate to render a decision regarding whether to use the raw current crop height to update the historical crop height estimate (or use another value in place thereof). By way of a particular example, during 1110, the main controller 202 determines whether the raw current crop height exceeds a minimum distance calculated as a fraction/percentage of the historical crop height estimate. If the raw current crop height exceeds the minimum, then a current crop height (for purposes of updating the historical crop height estimate) is established based upon the raw current crop height established during 940. Otherwise, the current crop height (for purposes of calculating a current historical crop height estimate) is established using the historical crop height estimate—more particularly by multiplying the historical crop height estimate by a fraction (e.g. 0.95).

During 1120, the main controller 202 updates the historical crop height estimate. By way of a particular example, the updated value for the historical crop height estimate is rendered by a filtering operation based upon the current historical crop height estimate, the best estimate of current crop height (rendered during 1110), and a filtering time constant (selected for long-term stability over several seconds of machine operation). As such, a historical estimate of the crop height is built over time. Based on the comparison mentioned above, the historical estimate can be updated with the new raw crop height measurement or by a recalculated previous crop height estimate. Doing it this way, provides the crop height estimate with correct updates when actual crop and ground is detected. Using the alternate update value, based on the historical estimate, ensures that the crop height estimate over time converges to the actual crop height even in an absence of appropriate crop or ground measurements. By way of initialization of the operations summarized in FIG. 11, an operator can provide an initial crop height estimate. Alternatively, a minimal crop height can be provided (e.g. for potato fields, providing the bank-height as minimal value).

By way of example, the historical crop height (see FIG. 11 described herein below), is generated (during 1120 described herein below) by a filtering operation having a relatively high time constant parameter (i.e., providing a relatively slow changing output).

By way of example, the historical crop height estimate is weighted 0.95 while a current crop height measurement is weighted 0.05 when rendering a current crop height estimate (during 1120).

In an exemplary embodiment, a user interface is provided through which a user interacts (even overrides) the operation of the automated multi-wing/segment boom control system described herein with reference to FIG. 2. From a design/feature point of view, the control configuration and operation of the main controller 202 is separate from manual control and configuration carried out by a user/operator via manual controls via a user interface that operate in complementary fashion with the main controller 202. Moreover, in an illustrative example, the main controller 202 implements any of a variety of implement/tractor electronics interfaces to facilitate a more complete view of an operating environment of the spray boom assembly 100, including operating parameters of an associated tractor/implement carrying/pulling apparatus.

A function of the exemplary user interface is to enable a user/operator to tune a configuration of a control algorithm carried out by the main controller 202. Additionally, the exemplary control arrangement carried out by the main controller 202 supports a broad and extensible set of configurable control operation settings. User selection of configurable sensor modes (streaming, filtered, noise suppression, etc.) and controller responsiveness/aggressiveness (e.g., coarse adjustments to changes in contour: actuator response time constants and signal change magnitude limits) enable users to make substantial changes to performance and/or stability of the main controller 202—without relying on a "self-learning/healing" capability of the main controller 202 which would unnecessarily delay adaptation of the boom leveling system to a rapidly changing operating environment. In cases where a boom comprises foldable wing tips, a user may be provided with a selectable configuration interface that allows a user to specify such major changes (including operation of the boom system 100 in a semi-folded physical configuration) to the main controller 202 to ensure proper modeling of the boom system by the controller when implementing a dynamic model.

Other potential configuration inputs affecting the operation of the control operations carried out by the main controller 202 include providing geospatial mapping information and contour pattern (e.g. headland) based control/response configuration (from previous runs through a same field using a same coverage path/pattern of the spray boom assembly 100) to aid configuration of the controller 202.

From a user perspective, configuration and utilization of spray boom leveling control carried out by the main controller 202 can be very simple. By way of example, a user customizes an acquired control program and configuration by providing a basic set of configuration parameters including an identification of a manufacture/model/version of spray boom assembly to establish a use-independent rough configuration. The rough configuration of the main controller 202 is followed by performing a self-learning operation based upon a few test sweeps/turns at intended operating speed, to fine tune signal noise suppression and filtering of both input and output signals of the main controller 202. Thereafter, during operation in the field, the system continues to receive and process both sensor and user input, to continuously adapt to a variety of changing operating conditions. Over time, the system can learn its own behavior and the wishes from the operator and use this to autotune (self-tuning) its performance. As such, a control configuration carried out by the main controller 202 adapts/changes over time. Self-tuning/automated parameter optimization, deep learning, machine learning and artificial intelligence may also become vital parts to enable the main controller 202 adapt seamlessly to the mechanical system in question.

While the illustrative examples have been depicted and described with reference to a trailing spray boom assembly 100, as noted above, the disclosure is not limited to such systems. It will be readily appreciated that, in view of the current disclosure, the advantages of the current disclosure are also applicable to a variety of spray boom assembly geometries and applications. As such, the current disclosure is intended to apply to a wide variety of spray boom assemblies and associated electronic control systems—with appropriate adjustments to the above-described determinations to accommodate variations in requirements and response characteristics arising from the presence of differing types of boom geometries, sensors and actuators.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for controlled leveling of a multi-wing boom assembly by a multi-loop controller arrangement including a main controller that renders actuation control commands to an actuator controller for causing positioning of actuators of the multi-wing boom assembly to reduce a determined current position error of components of the multi-wing boom assembly in relation to a determined contour of a field over which the multi-wing boom assembly is currently passing, the method comprising:
   executing, by the main controller operating according to a main controller repetition cycle period within which an actuation command is rendered for implementation by the actuator controller, a main controller loop to generate positioning commands to be carried out by the actuator controller; and
   executing, by the actuator controller independently of the main controller and in accordance with an actuator controller repetition cycle period having a duration that is independent of the main controller repetition cycle period, an actuator controller loop to generate control signals for the actuators of the multi-wing boom assembly.

2. The method of claim 1 wherein the main controller loop includes determining a position error.

3. The method claim 1 wherein the positioning commands are provided in accordance with a dynamic model of the multi-wing boom assembly.

4. The method of claim 3 wherein the dynamic model incorporates a pendulum physical model of the multi-wing boom assembly.

5. The method of claim 3 wherein the dynamic model incorporates a trapezium physical model of the multi-wing boom assembly.

6. The method of claim 3 wherein the positioning commands are calculated based upon a boom state that is based, in part, upon boom state sensor data.

7. The method of claim 6 wherein the boom state is augmented by off-boom measurement-based state information provided by a state observer.

8. The method of claim 2 wherein the main controller renders the position error in accordance with distance measurements rendered from ultrasound distance measurements using ultrasound sensors.

9. The method of claim 8, wherein the distance measurements are rendered by a single distance-per-emitted pulse ultrasound distance measurement arrangement.

10. The method of claim 8, wherein the distance measurements are rendered by a multiple distance-per-emitted pulse ultrasound distance measurement arrangement.

11. The method of claim 8, wherein the ultrasound distance measurements are generated using a peak detection-based filter.

12. The method of claim 8 wherein a raw current crop height is based upon a multi-sample measurement sequence, and wherein a current distance-to-crop is determined in accordance with a comparison of:
   the raw current crop height, and
   a historical crop height estimate that is rendered by a filtering operation performed on a historical crop height estimate and a current estimated crop height.

13. The method of claim 1 wherein the positioning commands include positioning commands for a boom lift position.

14. The method of claim 1 wherein the main controller loop is performed, in accordance with a current boom angle measurement to carry out a boom wing balancing operation.

15. The method of claim 1 wherein the actuator controller is further configured to carry out an obstacle avoidance control operation based upon contour sensor distance measurements.

16. The method of claim 3 wherein the dynamic model is augmented by modeling of mechanical construction of actuator related components.

17. A system for carrying out a controlled leveling of a multi-wing boom assembly by a multi-loop controller arrangement comprising:
   a main controller that renders actuation control commands; and
   an actuator controller for causing positioning of actuators of the multi-wing boom assembly to reduce a determined current position error of components of the multi-wing boom assembly in relation to a determined contour of a field over which the multi-wing boom assembly is currently passing,
   wherein the main controller and the actuator controller are configured to carry out a method comprising:
      executing, by the main controller operating according to a main controller repetition cycle period within which an actuation command is rendered for implementation by actuator controller, a main controller loop to generate positioning commands to be carried out by the actuator controller; and
      executing, by the actuator controller independently of the main controller and in accordance with an actuator controller repetition cycle period having a duration that is independent of the main controller repetition cycle period, an actuator controller loop to generate control signals for the actuators of the multi-wing boom assembly.

18. The system of claim 17 wherein the main controller loop includes determining a position error.

19. The system of claim 17 wherein the positioning commands are provided in accordance with a dynamic model of the multi-wing boom assembly.

20. The system of claim 19 wherein the dynamic model incorporates a pendulum physical model of the multi-wing boom assembly.

21. The system of claim 19 wherein the dynamic model incorporates a trapezium physical model of the multi-wing boom assembly.

22. The system of claim 19 wherein the positioning commands are calculated based upon a boom state that is based, in part, upon boom state sensor data.

23. The system of claim 22 wherein the boom state is augmented by off-boom measurement based state information provided by a state observer.

24. The system of claim 18 wherein the main controller renders the position error in accordance with distance measurements rendered from ultrasound distance measurements using ultrasound sensors.

25. The system of claim 24, wherein the distance measurements are rendered by a single distance-per-emitted pulse ultrasound distance measurement arrangement.

26. The system of claim 24, wherein the distance measurements are rendered by a multiple distance-per-emitted pulse ultrasound distance measurement arrangement.

27. The system of claim 24, wherein the ultrasound distance measurements are generated using a peak detection-based filter.

28. The system of claim 24 wherein a raw current crop height is based upon a multi-sample measurement sequence, and wherein a current distance-to-crop is determined in accordance with a comparison of:

the raw current crop height, and a historical crop height estimate that is rendered by a filtering operation performed on a historical crop height estimate and a current estimated crop height.

29. The system of claim 17 wherein the positioning commands include positioning commands for a boom lift position.

30. The system of claim 17 wherein the main controller loop is performed, in accordance with a current boom angle measurement to carry out a boom wing balancing operation.

31. The system of claim 17 wherein the actuator controller is further configured to carry out an obstacle avoidance control operation based upon contour sensor distance measurements.

32. The system of claim 19 wherein the dynamic model is augmented by modeling of mechanical construction of actuator related components.

\* \* \* \* \*